April 22, 1930.  I. FISHER  1,755,596

COMPARASCOPE

Filed Sept. 3, 1925  3 Sheets-Sheet 1

Inventor
Irving Fisher
By Henry E. Rockwell
Attorney

April 22, 1930.  I. FISHER  1,755,596

COMPARASCOPE

Filed Sept. 3, 1925    3 Sheets-Sheet 2

Inventor
Irving Fisher
By Henry E. Rockwell
Attorney

April 22, 1930.　　　　I. FISHER　　　　1,755,596
COMPARASCOPE
Filed Sept. 3, 1925　　　3 Sheets-Sheet 3
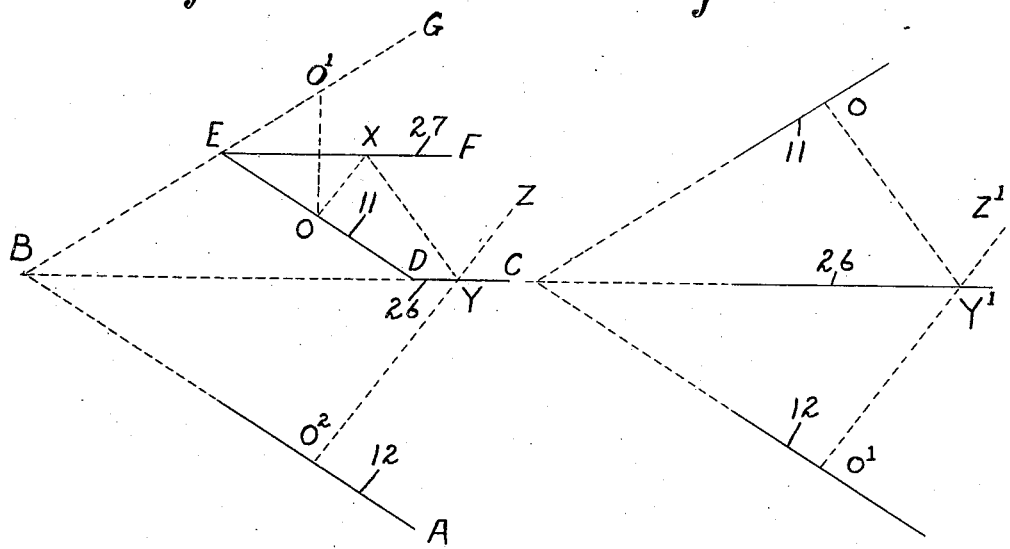
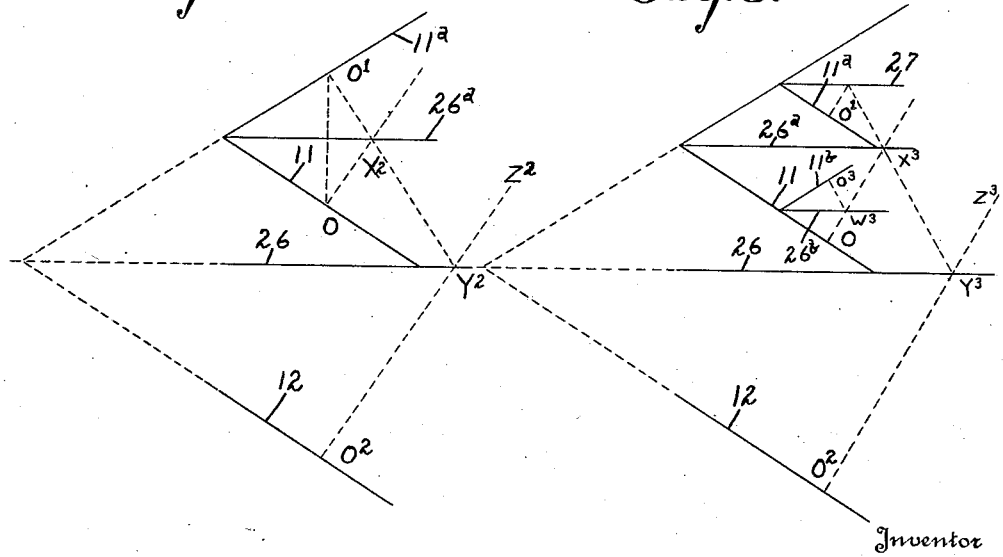
Inventor
Irving Fisher
By Henry E. Gockel
Attorney Patented Apr. 22, 1930

1,755,596

UNITED STATES PATENT OFFICE

IRVING FISHER, OF NEW HAVEN, CONNECTICUT

COMPARASCOPE

Application filed September 3, 1925. Serial No. 54,372.

This invention relates to a device by which two or more objects, such as charts or the like, may be easily and readily compared with each other, and to which I have given the name "comparascope". It is quite often desirable in scientific work to compare two or more curves so that the difference between such curves may be readily observed. This may sometimes be done by drawing one of the curves to be compared upon transparent paper and superposing it upon the other, but such a method is not entirely satisfactory, as paper which is sufficiently thin to be transparent is not usually sufficiently strong or heavy to be durable.

I contemplate, therefore, the provision of a device whereby the image of a chart or object may be made to appear by reflection upon a supporting surface upon which another object or chart may be placed so that an observer may see the reflected image coincidently, both as to time and location, with the second object or chart, and the two may, therefore, be readily compared. Preferably in most instances the image will be the result of double reflection so that the characters upon the first chart will appear to the observer in their proper order and not in reversed or "negative" arangement as would be true in the case of a single reflection.

One object of my invention is the provision of a device designed to support a pair of objects to be compared, and provided with reflecting devices whereby the image of one object, as seen by an observer, will appear to lie in the plane of the other object.

Another object of my invention is the provision of a device whereby an object may be viewed through a sheet of transparent material, such as glass, and at the same time the image of a second object may be reflected by this glass so as to appear to an observer to be in the plane of the first object.

Another object of my invention is the provision of a device of the character described such that the image of one object properly placed may appear to be superposed upon a second object, so that the two may be readily compared.

A still further object of my invention is the provision of a method of comparing two objects, such as charts, by causing the superposing upon one of the image of the other so that the comparison may be readily and easily made.

To these and other ends the invention consists in the novel features and combination of parts to be hereinafter described and claimed.

In the accompanying drawings:

Fig. 5 is a diagrammatic view showing the operation of the device;

Figs. 6, 7 and 8 are diagrammatic views showing various modified forms.

Figure 1:
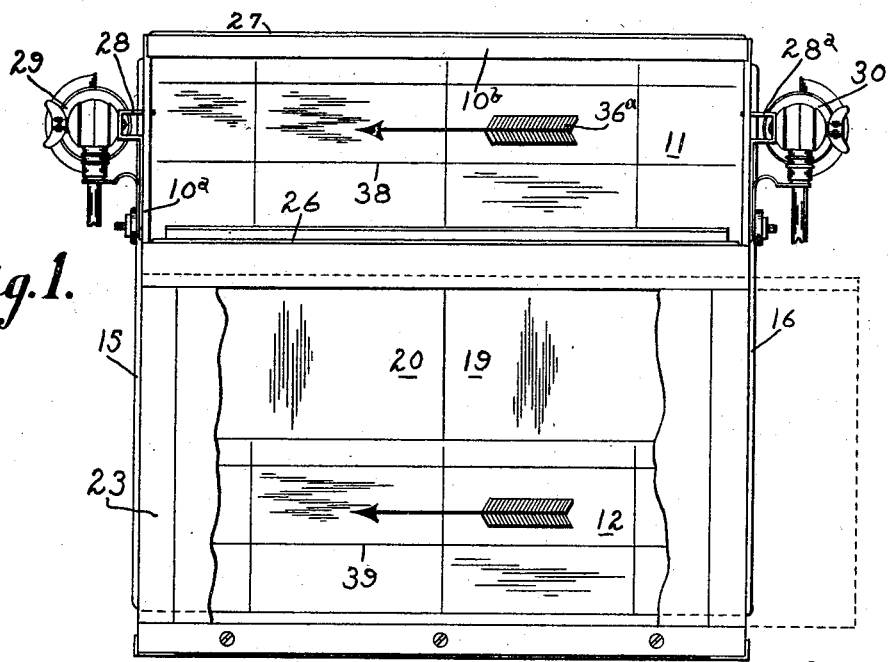
Fig. 1 is a front elevation view of a comparascope, embodying my invention, some parts being broken away to show the interior of the device.
Figure 2:
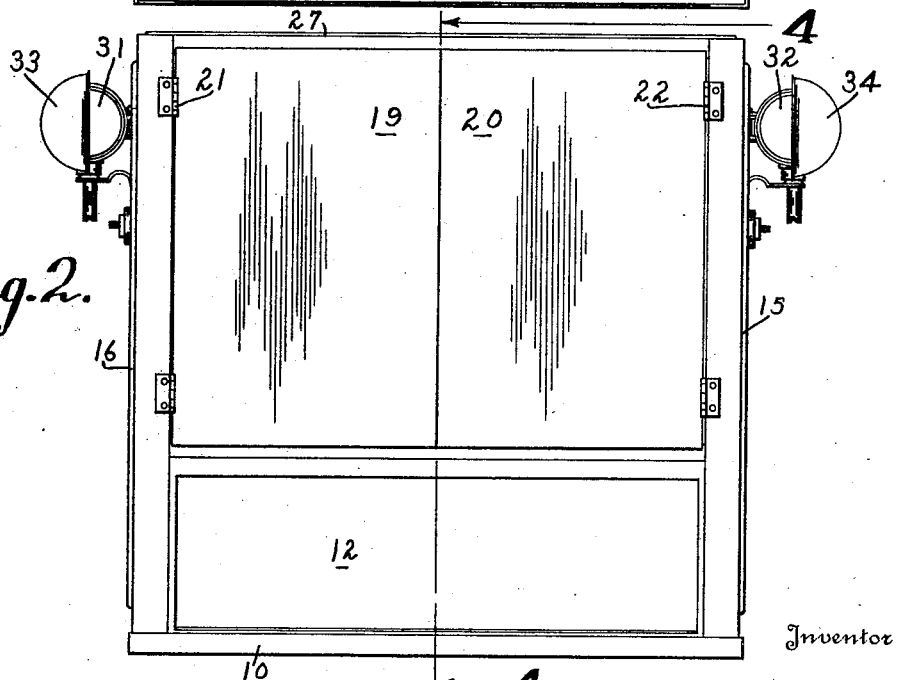
Fig. 2 is a rear elevational view of the same.
Figure 3:
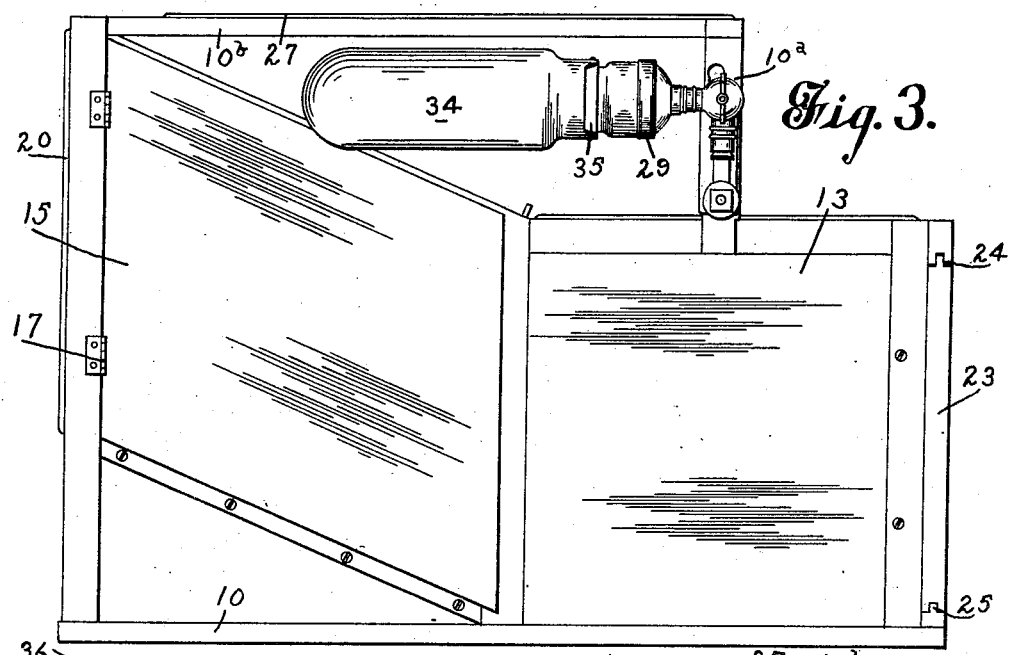
Fig. 3 is a side elevational view.

In the preferred form of my invention which I have selected to illustrate and describe, I have shown a cabinet comprising a frame 10 to which are secured upper and lower supports 11 and 12. These supports are preferably inclined, as shown, for the purpose of convenience. As shown, they are substantially parallel to each other, although such an arrangement is not necessary. The side walls of the cabinet consist of fixed forwardly disposed opaque members 13 and 14, and rearwardly disposed swinging doors 15 and 16, hinged to the frame at 17 and 18. These doors are likewise made of opaque material, and are arranged so that they may be opened to the extent to admit the desired quantity of light to the lower part of the cabinet, so as to properly illuminate the support 12 or objects resting upon its surface. The rear of the cabinet may be left open below the support 12, but is preferably provided with a pair of swinging doors 19 and 20 above this support, the doors being hinged at 21 and 22 to the frame. These doors may likewise be opened when it is desired to admit, upon the support 12, a greater quantity of light than is supplied through the doors 15 and 16.

The lower front portion of the cabinet is likewise closed by a movable closure member 23, arranged as shown in the drawings to slide to open position upon the ways 24 and 25. This member is preferably opaque and during the normal operation of the device will probably remain in closed position. It may, however, be moved to open position to give access to the interior of the cabinet.

A plate of clear glass 26 is mounted above the front portion of the cabinet and may be conveniently arranged in a horizontal position, as shown in the drawings. It will be apparent that an observer standing in front of the cabinet may, by looking through the glass 26, see an object upon the support 12.

Upon a super-structure $10^b$ of the frame, supported by the post $10^a$, is mounted a mirror 27 facing downwardly so that the image of an object upon the support 11 will be reflected by this mirror. Secured to the standards $10^a$ are brackets 28 and $28^a$ to which light sockets 29 and 30 are pivotally connected to swing in a vertical plane, so that these sockets may be adjusted to the desired angle, in order that the support 11 or objects thereon may be brightly illuminated by the bulbs 31 and 32 within these sockets. Reflectors 33 and 34 are adjustably secured to the sockets by means of the collars 35 so they may be rotated to properly direct the light upon the support 11, and to regulate the rays of the light from the bulbs by shutting them off from or permitting them to enter the lower part of the cabinet when the doors 15 and 16 are opened.

It will be apparent that when an object, represented for instance by the arrow $36^a$ of Fig. 1, is placed upon the support 11, the image of this object will be reflected by the mirror 27. An observer standing in front of the cabinet and looking through the plain glass 26 will see this image as reflected by the surface of the glass 26, and at the same time may look through the glass and see an object upon the support 12. The supports and reflectors are so arranged, as will be pointed out hereinafter, that the image of the arrow 36 reflected first by the mirror 27 and then by the glass 26, will appear to an observer upon the support 12.

Suppose, for instance, it is desired to compare two charts bearing curves, which may represent changes in prices, wages, or the like, over given periods of time. One of these charts may be placed upon the support 11 and the other upon the support 12. To provide convenient access to the support 11, an opening 36 is arranged at the rear of the mirror 27 so that a chart may be slipped through this opening upon the support. The image of the chart upon this support will be reflected by the mirror 27 and also by the surface of the plain glass 26, and will appear to an observer to be upon the support 12 where it will appear in coincidence with the other chart, and the points of similarity and difference between the curves may be at once apparent. The two supports may be marked with co-ordinate lines 38 and 39, as shown in Fig. 1, so that the charts may be placed at the proper locations. It will be apparent that as the light from the chart upon the support 11 is subjected to a double reflection, its image appearing upon the support 12 will be a true image, that is, the parts thereof will appear in their proper order and not in reversed or "negative" order as is the case when an image is produced by a single or any odd number of reflections.

When the proper light is admitted to the lower part of the cabinet upon the support 12 by means of the doors at the side, or at the rear, the image of the chart upon the support 11 and the chart upon the support 12 will be of substantially equal visibility, so that they may be readily compared. It is, of course, necessary for this effect to illuminate highly the chart upon the support 11, as a considerable quantity of light is lost by the reflection from the plain glass 26.

The principle of operation of my device is clearly shown by the diagrammatic view of Fig. 5, wherein the plane of the support 12 is represented by the line AB, the plane of the plain glass 26 by the line BC, the plane of the support 11 by the line DE, and the plane of the mirror 27 by the line EF. The dotted line OXYZ shows the path of the light from an object upon the support 11 to the eye of an observer at the point Z. The ray of light OX from the object O, striking the mirror at the point X, will be reflected along the line XY, striking the plain glass at the point Y, where it will be reflected along the line YZ. The observer looking in the direction ZY from which the ray of light comes, naturally sees the image in this line of vision. The image of the object O in the mirror 27 would, of course, appear to be at the point $O^1$, such that the plane of the mirror is a perpendicular bisector of the line $OO^1$. The image of $O^1$ seen in the glass 26 will likewise appear to be at the point $O^2$, such that the line BC or the plane of the plate glass is a perpendicular bisector of the line $O^1O^2$. For this reason, therefore, the observer looking in the direction ZY sees the second image $O^2$ of the object O upon the plane BA, for, as indicated in this figure, the parts of the lines are so arranged that the point $O^1$ is as far above the plane of the plate glass BC as the point $O^2$ is below it. The plane represented by the line BG is so drawn that the angle GBA is bisected by the plane of the plate glass BC. For this reason, any object or image in the plane BG will appear in the plane BA as seen reflected in the plate glass 26 in the plane BC. In order, therefore, to have the image of an object at O appear in the plane BA by double reflection, it is only necessary to place this object and the mirror 27 so that its first image will appear in the plane BG. It will be seen that this will be the result when the plane of the mirror EF bisects the angle GED. That is, bisects an angle between the plane of the support 11 and the imaginary plane BG. It will, therefore, be clear that it is not necessary to have the support 11 parallel to the support 12, but for the proper operation of the device it is only necessary to have the reflectors 26 and 27 so disposed that their planes will bisect respectively the angles GBA and GED. Having this relation between the parts, an observer looking along the line ZY will see the image of a point O at the point $O^2$ upon the surface 12, and at the same time may see an object upon this support so that the real object and the image may be compared.

While I have especially referred to the use of my device in the comparison of charts, curves, or the like, it will be apparent that it is susceptible of other uses as well. For instance, a draftsman in copying a drawing may place that drawing upon the support 11 and the image of the drawing will appear upon the support 12, where it may readily be traced upon a sheet of paper upon this support. Also, the outline of a distant object may be traced by placing the cabinet in a position facing the object and tilting the entire cabinet or the mirror 27 so that the image of the object will be reflected by the mirror and will appear upon the surface 12, where it may be traced.

Likewise, one may determine the visibility of a chart when reduced in size, as is sometimes necessary when charts are reduced for publication. The chart may be placed at a distance so that its image properly reduced will appear upon the surface 12 by reflection by the mirror and plain glass, and it can then be determined whether the chart as so reduced will be readable. Similarly, it may be determined whether or not a chart when placed before an audience may be read by persons in distant seats. A great many other uses will naturally appear to those skilled in the art, and it will be unnecessary to detail all of them herein.

I have shown in a diagrammatic form, a modification of my device in Fig. 6, wherein the mirror is dispensed with and the support 11 is positioned in the plane BG of Fig. 5. That is, so positioned that the plane of the plate glass 26 bisects the angle between the supports 11 and 12, as shown in Fig. 6. The object or chart to be viewed is secured upon the lower side of the support 11 if this support is opaque, or in case the support is transparent, as when made of glass, the object may be secured to the upper surface so as to show through the glass. An observer looking in the direction $Z^1Y^1$ will see the image of the point O at $O^1$ upon the support 12. As this image is produced by a single reflection, the parts will not appear in their normal order but will be reversed. This, however, is sometimes useful as, for instance, in comparing certain curves where the normal tendency is for one curve to go up when the other drops, it is convenient to have one of the curves reversed to make a proper comparison. The observer, when looking in the plate glass 26, may, of course, see the real object upon the support 12, as well as the image of the object secured to the lower side of the support 11.

In Fig. 7, I have shown a further modification of my device, wherein instead of using a single plate of plain glass and a mirror, I employ two plates of plain glass 26 and $26^a$ and three supports 12, 11 and $11^a$. It will be apparent that the image of any object O upon the support 11 will be reflected by the plain glass $26^a$ and also by the plain glass 26, according to the principles already explained in connection with Fig. 5 of the drawings, and will appear to be at the point $O^2$ upon the surface 12 to an observer at $Z^2$ looking through the glass 26, the light from the object passing along the lines $OX^2Y^2Z^2$. Likewise, the image of an object $O^1$ upon the support $11^a$ will be reflected by the glass 26 and will also appear at $O^2$ upon the support 12, the light from the object $O^1$ passing through the glass $26^a$ to be reflected by the glass 26 along the line $O^1Y^2Z^2$, while the light from the object O is reflected by both plates of glass 26 and $26^a$. In this form of my invention, it is, therefore, possible to compare three objects one upon the support 12, one upon the support 11, and one upon the support $11^a$, the images of the last named two appearing upon the support 12. It will, of course, be clear that while the image of the object O on the support 11 will appear by double reflection upon the support 12, the image of the object $O^1$ will be reflected but a single time and its parts will, therefore, be in reverse order.

The principles of my invention may be carried to a still further extent, and almost any number of images may be made to appear upon the support 12. Where one of these images is caused by a single reflection, its parts will, of course, be in the reverse of their normal order, but such will not be the case where all of the images are caused by a double reflection. In Fig. 8, for example, I have shown a construction wherein are employed three supports 12, 11 and $11^a$, two plates of plain glass 26 and $26^a$ and a mirror 27. It will be apparent that the images of the objects O upon the support 11 and $O^1$ upon the support $11^a$ will be caused by double reflection to appear at the point $O^2$ in coincidence with an object placed in the proper position upon the support 12. The image of the object O will be reflected by the plates of plain glass $26^a$ and 26, while the image of the object $O^1$ will be reflected by the mirror 27 through the glass 26ᵃ to be reflected again by the glass 26. In this instance, both images are produced by a double reflection. This principle may, of course, be carried still further and additional supports and reflecting surfaces added. Any number N of supports may be used with N minus 1 plates of glass, as shown, for instance, in Fig. 7, so as to make possible the coincidence of N diagrams, the parts of all but one of which will appear in their proper order, this one being reversed. Likewise, as shown in Fig. 8, I may use any number N of supports with N minus 1 plates of plain glass and one mirror, so that N diagrams may be made to coincide, the parts of all of which will appear in their proper order. Also a number of negatives may be obtained at the same time for if in Fig. 8 a support 11ᵇ and and a plain glass 26ᵇ be added in the position shown, the image of an object O³ upon the support 11ᵇ will be reflected by the plates of glass 26ᵇ, 26ᵃ and 26 along the line O³W³X³Y³Z³ and by triple reflection will be seen by an observer at Z³ with the parts in reverse order, at the same time that the other images are seen.

Figure 4:
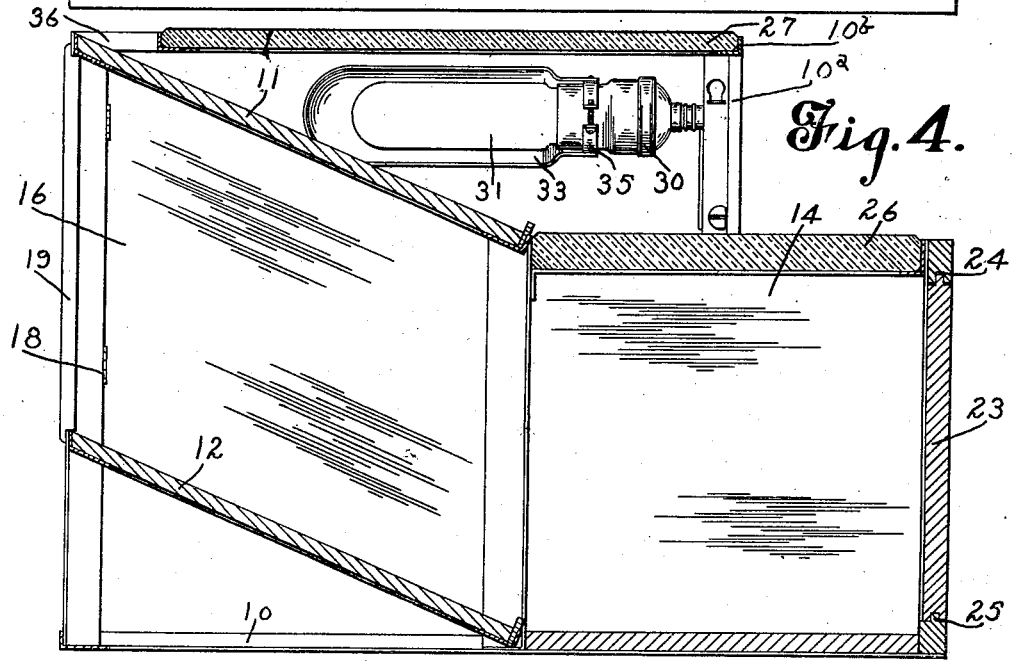
Fig. 4 is a sectional view on line 4—4 of Fig. 2.

It will be understood that as shown in Fig. 4, for example, the light from an object upon the support 11 will be reflected from the back of the mirror 27 or the upper surface, as shown in this figure. The light in passing through the glass of the mirror from the lower surface thereof to the reflecting surface, will be refracted or turned from its original path, and likewise, the reflected ray will be turned when passing from the glass into the atmosphere. It will be obvious, therefore, that such a ray of light is turned by its passage in and out of the glass of the mirror an amount corresponding to that occurring in a passage through a parallel glass of thickness double that of the mirror. To compensate for this refraction and to cause the coincidence of this image with the object on the support 12, I use a plate of glass 26 of thickness double that of the mirror 27. With this arrangement and with the parts properly located according to the principles developed in the drawing of Fig. 5, I find that the image of an object upon the support 11 properly coincides with the real object upon the support 12, as viewed through the plate of glass 26.

In the use of my device I have found that a duplication of the images appear on the support 12, due to the fact that reflection occurs from the lower surface of the plain glass 26, as well as the upper surface. In some instances this duplication is confusing and I have discovered that it may be obviated by placing upon the lower surface of the glass 26 a thin film of some transparent substance which will adhere to the surface of the glass and destroy the reflection from this surface. A film of water will serve the purpose, but on account of its evaporation, will, of course, not be permanent, and I prefer to use a thin adherent coating or film of colorless petrolatum which has been found to function satisfactorily for this purpose. Other substances may also be used provided they do not destroy the transparency of the glass.

While I have shown and described some preferred embodiments of my invention, it will be understood that it is not to be limited to all the details shown, but is capable of modification and variation within the spirit of the invention and within the scope of the appended claims.

What I claim is:

1. In a device of the character described, a cabinet comprising side walls and a pair of supports supported between said walls, one above the other, a reflecting member positioned above the upper support and facing the same, a plate of transparent material below said reflecting member and in front of the upper support, said plate being above and in front of the lower support, whereby an object on the lower support may be viewed therethrough and the image of an object on the upper support and reflected by the reflecting member will be reflected therefrom.

2. In a device of the character described, the combination of two supports and means to cause the image of an object placed upon one of said supports to appear in coincidence with an object placed upon the other support, said means including an opaque reflecting member to reflect an image of one of said objects, and a wholly transparent member through which the other object may be viewed and by which the first image may be reflected.

3. A frame having mounted therein a plane support and a mirror positioned at an angle to each other, a second plane support and a plate of glass also mounted in the frame and positioned at an angle to each other so that the planes of the supports intersect respectively the planes of the mirror and glass, and all of said elements being so positioned that the planes of the mirror and glass bisect respectively the dihedral angles between the planes of the respective supports and a plane passed through the said lines of intersection.

4. In combination, a frame, two supports mounted in said frame, a plate of glass mounted above and forwardly of one of the supports, a mirror mounted above and facing the other support and the glass and means mounted on the frame to illuminate one of said supports.

5. In combination, a frame, two supports mounted in said frame, a plate of glass mounted above and forwardly of one of the supports, a mirror mounted above and facing the other support and the glass, and closure members associated with the frame to regulate the illumination of one of said supports.

6. In combination, a frame, a pair of supports mounted in the frame, one above the other, a plate of glass disposed above one of said supports through which it may be viewed, a mirror positioned above and opposing the other support, means to illuminate the last named support, and adjustable closure members mounted on the frame to regulate the amount of light permitted to fall upon the first support.

7. In combination a cabinet, a support within the cabinet, a plate of wholly transparent glass through which said support may be viewed, said cabinet being provided with closure members to admit light to the support, a second support disposed above the first, and a mirror positioned above the second support and designed to reflect rays of light coming therefrom toward said glass, whereby the image of an object upon the second support may appear to be upon the first support as viewed by an observer through the glass.

8. In combination, a cabinet, a support within the cabinet, a plate of glass through which said support may be viewed, said cabinet being provided with closure members to admit light to the support, a second support disposed above the first and a mirror positioned above the second support and designed to reflect rays of light coming therefrom toward said glass, whereby the image of an object upon the second support may appear to be upon the first support as viewed by an observer through the glass, and means supported by the cabinet to illuminate brightly the second support.

9. In a device of the character described, means to support an object, an image receiving surface, and means including a transparent plate to reflect an image of an object on said supporting means and cause it to appear upon said surface to an observer while permitting the latter to see a real object placed upon this surface, said transparent plate having an adherent film of transparent material applied to one surface thereof to prevent reflection from this surface.

In witness whereof, I have hereunto set my hand this 28th day of August, 1925.

IRVING FISHER.